United States Patent [19]

Schultz

[11] Patent Number: 4,976,597

[45] Date of Patent: Dec. 11, 1990

[54] APPARATUS FOR INSERTING STICKS INTO ICE CREAM BODIES

[75] Inventor: Gert Schultz, Hillerød, Denmark

[73] Assignee: Stormax International A/S, Lynge, Denmark

[21] Appl. No.: 444,266

[22] Filed: Dec. 1, 1989

[30] Foreign Application Priority Data

Dec. 2, 1988 [DK] Denmark ............................. 6745/88

[51] Int. Cl.$^5$ .......................... A23G 9/26; A23G 9/28
[52] U.S. Cl. ................................... 425/126.2; 221/116
[58] Field of Search ..................... 425/126.2; 221/112, 221/114, 116

[56] References Cited

U.S. PATENT DOCUMENTS

| 4,105,384 | 8/1978 | Moerch | 425/126.2 |
| 4,323,336 | 4/1982 | Harper et al. | 425/126.2 |

Primary Examiner—Willard Hoag
Attorney, Agent, or Firm—Pollock, Vande Sande & Priddy

[57] ABSTRACT

Apparatus for inserting sticks into ice cream bodies filled into mould cavities open at the top and continuously or stepwise passing below the stick inserting apparatus, said apparatus comprising a stick feeding mechanism feeding sticks to a conveyor which reciprocates relative to said feeding mechanism and which advances the sticks to a set of receiving means gripping and removing said sticks from the conveyor. The apparatus comprises furthermore a set of inserting means which remove the sticks from the receiving means so as to insert said sticks into the mould cavities. The apparatus comprises two feeding mechanisms are provided which feed their respective conveyor, said conveyors being associated with their respective set of receiving means and their respective set of inserting means. The sets of inserting means are disposed such that alternately they are moved into and insert the sticks in one and the same vertical inserting plane in the apparatus.

4 Claims, 4 Drawing Sheets 4,976,597

APPARATUS FOR INSERTING STICKS INTO ICE CREAM BODIES

FIELD OF THE INVENTION

The invention relates to an apparatus for inserting sticks into ice cream bodies formed by portions of ice cream being filled into mould cavities open at the top and continuously or stepwise passing below the stick inserting apparatus, said apparatus comprising a stick feeding mechanism feeding sticks to a conveyor which reciprocates relative to said feeding mechanism and which advances the sticks to a set of receiving means gripping and removing said sticks from the conveyor, and where a set of inserting means are provided which remove the sticks from the receiving means so as to insert said sticks into the mould cavities.

BACKGROUND ART

US-PS No. 4,105,384 discloses an apparatus of the above type. Such an apparatus is often used for ice freezing machines having a conveyor, such as a belt conveyor or a supporting member which is pivotal about a vertical axis and carries a plurality of mould cavities arranged in rows. The rows of mould cavities are moved in turn to a position below the apparatus inserting the sticks into the ice cream bodies in the mould cavities, said ice cream bodies at the time in question being of such a consistency that the insertion of the sticks is possible and such that the sticks can be retained in vertical position after the sticks have been positioned by the inserting apparatus.

When the capacity of such an ice freezing machine is to be increased it is necessary to insert more sticks per time unit, and previously the latter has only been possible by speeding up the working rate of the stick inserting apparatus. However, the rather complicated handling of ice lollies restricts the working rate of such a stick inserting apparatus. Therefore an increase of the capacity of the ice freezing machine involves various measures such as extra room allowing installation of an additional stick inserting apparatus and complicated equipment for the control of the ice freezing machine in such a manner that all the ice cream bodies are provided with a stick without increasing the stay of the ice cream bodies in the mould cavities to such a degree that the removal thereof from said mould cavities is made difficult.

SUMMARY OF THE INVENTION

Accordingly it is the object of the invention to provide an apparatus for inserting sticks which is suited for use in connection with existing ice freezing machines and which simultaneously allows a relatively high working rate.

In satisfaction of the foregoing object and advantages there is provided by the present invention an apparatus, wherein two feeding mechanisms are provided for feeding their respective conveyor, said conveyors being associated with their respective set of receiving means and their respective set of inserting means, and wherein the sets of inserting means are disposed such that alternately they are moved into and insert the sticks in one and the same vertical inserting plane in the apparatus.

As a result an inserting apparatus is obtained where the sticks are inserted into rows of mould cavities always opposing the same position, i.e. in the vertical inserting plane in the ice freezing machine. In this manner it is possible to increase the number of strokes per minute of the inserting apparatus from about 25 to for instance 50 without causing problems with the sticks. The only requirement to the ice freezing machine is that the conveyor is moved at a higher speed. The inventive inserting apparatus is relatively compact as the sets of inserting means can be situated very close to one another, said sets of inserting means only alternately being positioned in the inserting plane.

According to a particularly advantageous embodiment of the invention the two sets of inserting means are disposed on a common frame, where the sets of inserting means are situated on their respective set of interconnected vertical guide bars, along which the sets of inserting means are alternately displaced downwards towards the mould cavities and upwards onto a level with the associated receiving means, and where the vertical guide bars are disposed on a plurality of horizontal guide bars in such a manner that the sets of inserting means present on said vertical guide bars reciprocate between the vertical inserting plane and the associated receiving means, the distance between said inserting plane and said associated receiving means being such that one set of inserting means is positioned so as to co-operate with the associated receiving means while the second set of inserting means is positioned in the inserting plane. In this manner a particularly simple guiding of the inserting means is obtained, whereby one set of inserting means is provided with sticks from the receiving means simultaneously with the other set of inserting means inserting sticks into the ice cream bodies therebelow. Such a procedure allows a particularly high working rate.

Furthermore according to the invention the sets of interconnected vertical guide bars may comprise bars situated at their respective end of the sets of inserting means when seen in the displacing direction of the conveyor of the apparatus, and at each end of the sets of inserting means the vertical guide bars may be situated on their respective horizontal guide bar or on their respective set of horizontal guide bars permanently secured in the apparatus. As a result a particularly reliable guiding of the sets of inserting means is obtained.

Finally according to the invention the vertical guide bars may be horizontally displaced by means of a first pneumatic cylinder actuating the vertical guide bars at one end of the sets of inserting means, whereas the opposite end of said sets of inserting means is caused to enter a correctly locked position in outer displacement positions by means of a directly actuating second pneumatic cylinder. In this manner a correct positioning of all the sticks in the ice cream bodies is ensured.

BRIEF DESCRIPTION OF THE DRAWINGS

The invention is described in greater detail below with reference to the accompanying drawing, in which.

DESCRIPTION OF PREFERRED EMBODIMENTS

Figure 1:
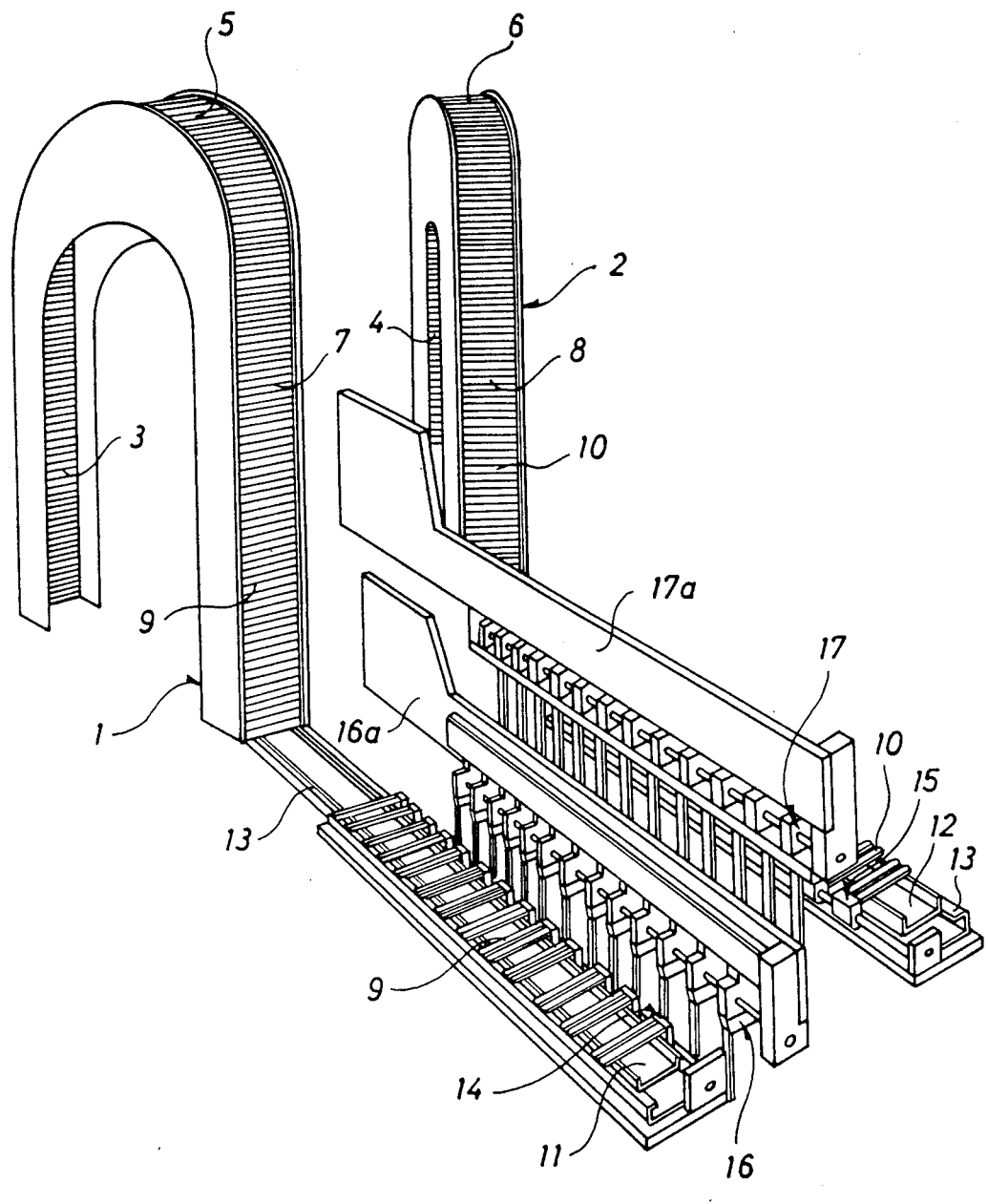
FIG. 1 is a diagrammatic, perspective view of an apparatus according to the invention, whereby parts of the apparatus have been removed for the sake of clarity.

In use the apparatus of FIG. 1 is situated above an ice cream freezing machine in such a manner that a part of the apparatus extends above the freezing member of said machine and the mould cavities situated therein, said cavities not appearing from the drawing.

Relative to a common vertical inserting plane in which the sticks are inserted into a row of mould cavities, the apparatus comprises invertedly arranged apparatus parts substantially corresponding to the parts of the apparatus described in the above US-PS No. 4,105,384. Each part comprises thus a stick feeding mechanism having a stick feeding passage indicated by the general reference numeral 1 and 2 and shaped like an inverted U. One of the vertical legs 3, 4 of the U constitutes a passage in which the sticks are moved upwards. The sticks are fed at the bottom of the passage by means of known feeding means, for instance screw feeders, and are pushed upwards by said feeding means through the passage 3, 4. The passage is by means of the arched portion 5, 6 connected to another vertical portion 7, 8 constituting the feeding passage of the associated part of the apparatus. The sticks 9, 10 are moved vertically downwards in the feeding passage so as to be transferred to a horizontally movable conveyor slide 11, 12. The conveyor slide 11, 12 is horizontally arranged and mounted on horizontal beds 13 so that it can reciprocate by means of driving means not shown between an advanced position shown in FIG. 1 and a retracted or starting position below the stick feeding passage 1, 2. The return movement in which the slide is empty, i.e. without any sticks, is carried out at a higher speed than the forward movement, and these movements as well as the other movements of the apparatus are controlled automatically by means of electric, hydraulic and/or pneumatic control means of conventional type, which need not be explained.

The conveyor slide 11, 12 is fed with sticks at the stick feeding passage 1, 2 in such a way that twice the number of sticks as the number of mould cavities in a row in the ice freezing machine are arranged on the slide. As shown in FIG. 1 the sticks are arranged in spaced pairs two by two, where the distance between the pairs are the same as the distance between the mould cavities in a row in the ice freezing machine. A set of receiving means provided with the general reference numeral 14 and 15 is provided opposite the sticks in the advanced position of the conveyor slide 11 and 12, respectively. The receiving means are adapted such that simultaneously they remove all the sticks 9, 10 horizontally arranged on the slide and turn said sticks away from the slide and into a vertical position while moving a distance parallel to the longitudinal direction of the conveyor slide, said distance corresponding to the space between two sticks of a pair.

A set of diagrammatically shown inserting means provided with the general reference numeral 16 and 17 is provided next to the conveyor slide 11, 12 in the advanced position thereof. The inserting means are adapted to grip the sticks, i.e. one half of the pairs at a time, from the associated set of receiving means 14 and 15 and initially to carry said sticks vertically upwards from the receiving means and subsequently downwards into the mould cavities along a path which is described in greater detail below.

As mentioned before the two apparatus parts described above correspond individually substantially to the parts described in the above US-PS No. 4,105,384, the two inversed apparatus parts both showing the above structural features and operating in the same way. The only feature distinguishing each apparatus part from the apparatus of the US-PS No. 4,105,384 is that the set of inserting means 16, 17 does not carry the sticks directly vertically downwards into the mould cavities in the same plane as the one in which they are removed from the receiving means. The sticks are instead removed from the associated conveyor slide 11, 12 and transferred to a common inserting plane. The latter movement is achieved by means of the means shown in FIG. 2.

Figure 2:
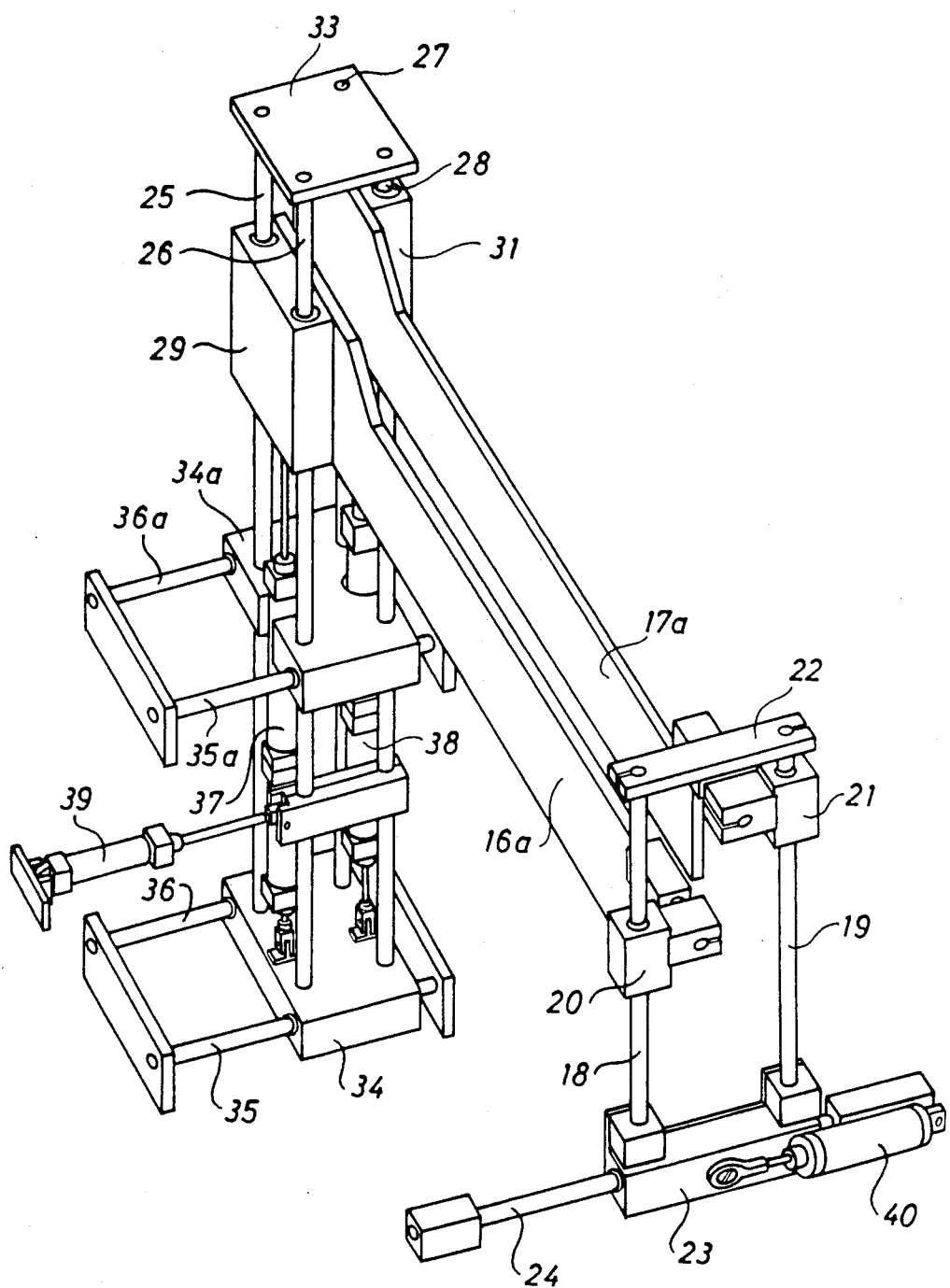
FIG. 2 is a perspective view of a frame displacing the sets of inserting means of FIG. 1, FIGS. 3A, 3B and 3C are diagrammatic end views of a conveyor with associated sets of receiving means and inserting means and illustrating various steps of a working cycle.

FIG. 2 illustrates two carrying beams 16a and 17a adapted to carrying the inserting means 16. 17 not shown here for the sake of clarity. The carrying beams 16a and 17a are disposed on their respective vertical front guide bar 18 and 19, respectively, at their end farthest from the stick feeding passage 1 and 2, respectively. The beams are disposed on said bars by means of a slidably mounted block 20 and 21, respectively. The guide bars 18 and 19 are interconnected at the ends by means of a connecting member 22 and 23, respectively, the latter connecting member 23 being disposed on a horizontal, front guide bar 24 secured to the frame of the apparatus in a manner not described in greater detail. Correspondingly, the opposite rear end of each carrying beam 16a and 17a is disposed on vertical rear guide bars 25, 26 and 27, 28, respectively. More specifically the carrying beam 16a is secured on a horizontal carrying block 29 slidably mounted on the associated guide bars 25 and 26. Correspondingly, the second carrying beam 17a is secured on a carrying block 31 also slidably mounted on the associated vertical guide bars 27 and 28.

All the rear vertical guide bars 25, 26, 27 and 28 are interconnected both at the top at the bottom and in the middle by means of a connecting means 33, 34 and 34a, respectively, of which the lowermost and the intermediary connecting means 34 and 34a each are disposed on two horizontal guide bars 35 and 36 and 35a and 36a, respectively. A double-acting pneumatic cylinder 37 and 38, respectively, is situated between the lowermost connecting means 34 and the carrying block 29 and 31 permanently connected to the carrying means 16a and 17a of the inserting means. The pneumatic cylinder 37 and 38, respectively, is adapted to actuate the associated set of inserting means 16 and 17 so as to move up and down in vertical direction on the vertical guide bars. The vertical rear guide bars 25, 26, 27 and 28 are furthermore connected to a pneumatic cylinder 39 operating in horizontal direction and adapted to displace the vertical guide bars and consequently the two sets of inserting means 16 and 17 forward and backwards in horizontal direction both on the front horizontal guide bar 24 and on the rear horizontal guide bars 35, 36 and 35a and 36a, of which the latter bars are also permanently secured to the frame of the apparatus in a manner not described in greater detail.

A second horizontally operating pneumatic cylinder 40 is provided in connection with the lowermost connecting means 23, by means of which the two front vertical guide bars 18 and 19 are disposed on the front horizontal guide bar 24. The second cylinder is such that it is activated when the inserting means 15 and 16 have reached the immediate vicinity of the two outer positions in which they are positioned by means of the previously mentioned horizontally operating pneumatic cylinder 39. At the front end of the carrying beams 16a, 17a of the sets of inserting means the pneumatic cylinder 40 ensures that said front ends are fixed in a correct position. As a result the stability of the apparatus is increased during the vertical displacements which the inserting means are subjected to in these positions.

Figure 3A:
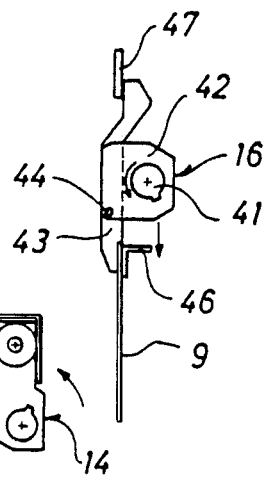
Figure 3B:
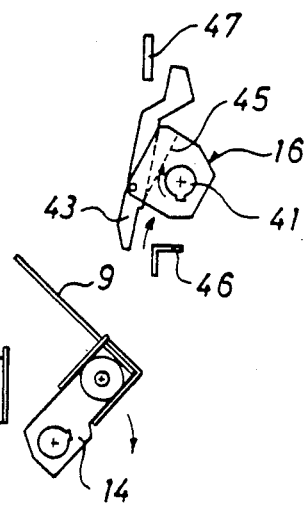
Figure 3C:
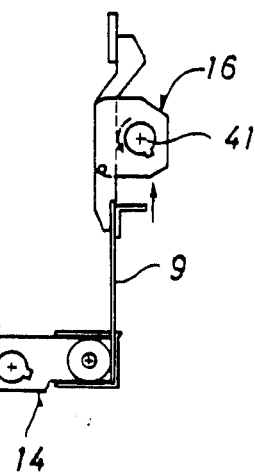

FIGS. 3A, 3B and 3C are diagrammatic views of the function of the conveyor slide 11 with the associated set of receiving means 14 and inserting means 16 during the various steps of their working cycle. The illustrated embodiment of the inserting means 16 comprises a rectangular block 42 secured on a horizontal pivotal bar 41. A finger 43 is pivotally mounted on said block 42 about a pin 44. The finger is received in a recess in the block 42, said recess being indicated by means of a dotted line 45 in FIG. 3B. The lower end of the finger 43 is adapted so as to co-operate with a horizontal, sectional bar 46 common to all the fingers 43 of the inserting means. The rear end of the finger 43 is correspondingly adapted to co-operate with a horizontal bar 47 also common to all the fingers 43 of the inserting means.

The inserting means 16, 17 of the two sets are secured in a manner not described in greater detail to the carrying beams 16a, 17a, the horizontal bars 47 being suitably secured to said beams and the shafts 41 being pivotally mounted at the ends and connected to pneumatically activated driving means.

By turning the shaft 41 counter-clockwise, cf. FIG 3A, the lower end of the finger 43 is pressed against the horizontal sectional bar whereby a stick 9 can be gripped by said finger and said bar. By turning the shaft 41 clockwise, cf. FIG. 3B, the slot between the front end of the finger 43 and the sectional bar 46 is opened with the result that the stick 9 is no longer gripped by the finger and the bar, and consequently it is possible to insert a fresh stick 9. The finger 43 may be actuated by springs (not shown) which ensure removal of the lower end of the finger from the sectional bar 46 when the shaft 41 is clockwise turned.

In FIG. 3A the set of inserting means 16 is moving downwards with a set of sticks to be inserted in a row of mould cavities. At the same time, the set of receiving means 14 has been turned into position so as to receive another double portion of sticks advanced by the conveyor slide 11. In FIG. 3B the set of inserting means 16 has inserted a portion of sticks into a row of mould cavities, and the receiving means 14 are moving into a position with one or two portions of sticks 9, said sticks 9 being vertically positioned in said position, cf. FIG. 3C.

In FIG. 3B the inserting means are ready to receive another portion of sticks 9. The sticks are positioned so as to abut the sectional bar 46 while the receiving means 14 are clockwise turned. As mentioned above, the receiving means are subjected to a brief axial movement before the fingers 43 of the inserting means 16 are caused to engage the next portion of sticks depending on whether it is the first of the two portions in the receiving means or the second portion thereof. The latter also appears from the known inserting apparatus.

Having engaged a portion of sticks of FIG. 3C, the inserting means 16 are carried a short distance upwards so as to remove said sticks from the receiving means 14.

Figures 4A, 4B, 4C, 4D:
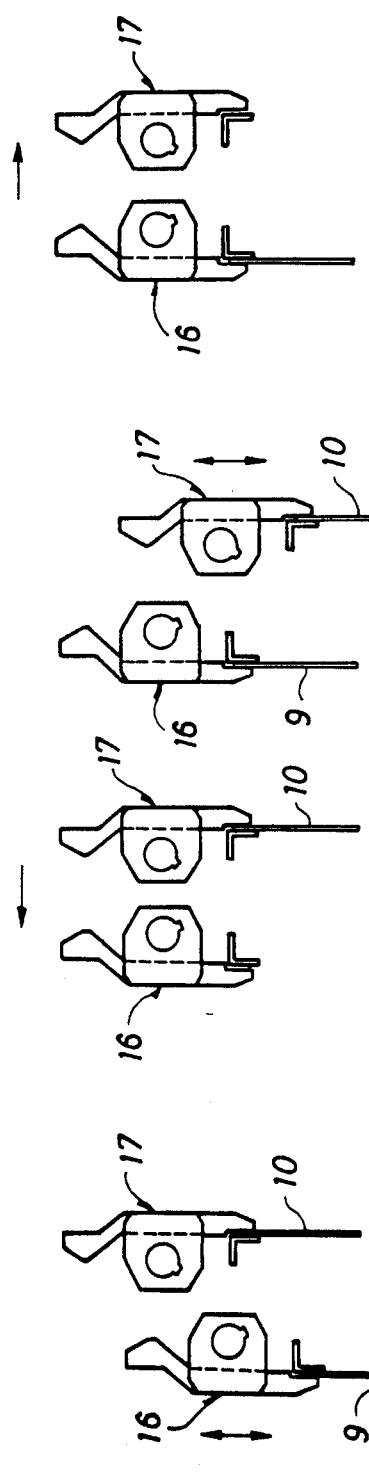
FIGS. 4A, 4B, 4C and 4D are diagrammatic end views of the two sets of inserting means in various steps of their working cycle and illustrated relative to a mould cavity therebelow.

The movement of the inserting means 16 relative to the mould cavities and consequently also to the associated receiving means 14 and 15 and the conveyor means 11 and 12 is illustrated in greater detail in FIGS. 4A, 4B, 4C and 4D and is determined by the displacement of the relevant means relative to the vertical and horizontal guide bars on which they are mounted. In FIG. 4A the left set of inserting means 16 is moving downwards into a row of cavities 50, whereas the right second set of inserting means 17 is receiving another portion of sticks 10 from the associated receiving means 15 (not shown). The set of inserting means 16 is moved up and down in vertical direction on the vertical guide bars 18, 25 and 26 while actuated by the pneumatic cylinder 37.

In FIG. 4B the left set of inserting means 16 has been moved upwards into an upper position relative to the vertical inserting plane in which the sticks inserted into the ice cream bodies inside the mould cavities 50 are now situated. Subsequently, both sets of inserting means 16 and 17 are positioned to the left in such a manner that the right set of inserting means 17 is caused to enter the vertical inserting plane whereas the left set of inserting means 16 is caused to enter a position in which it can receive another portion of sticks 9 from the associated set of receiving means 14. The horizontal displacement is caused by the vertical guide bars being displaced along the associated horizontal guide bars 24, 35. 36. 35a and 36a substantially by means of the pneumatic cylinder 39 and as mentioned for entering a locking position by means of the pneumatic cylinder 40 situated in front.

In FIG. 4C the right set of inserting means 17 with a portion of sticks 10 is moving downwards into another row of mould cavities 50, said movement being carried out along the associated vertical guide bars 19, 27 and 28 in the same vertical inserting plane as the one in which the portion of sticks 9 was inserted. In FIG. 4D the set of inserting means 17 has returned to its upper position ready to be solved to the right again so as to receive another portion of sticks 10.

Figure 5B:
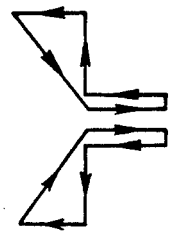
FIGS. 5A and 5B are diagrammatic views of the moving path of the sets of inserting means seen from the end of the apparatus.
Figure 5A:
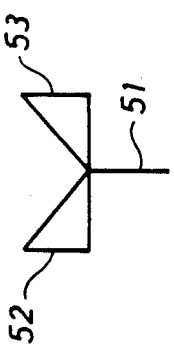

FIG. 5A is a diagrammatic view of the above movement pattern, where—when seen from the end of the set of inserting means—the insertion takes place in a vertical direction in a common plane 51 whereas the remaining movement pattern of the inserting means follows a triangle 52 and 53 to each side relative to the vertical plane. In FIG. 5B the corresponding directions of said movements are shown, whereby the movement in the vertical plane 51 takes place in said common inserting plane 51 until the sets of inserting means are on the same level. As illustrated, one set of inserting means retracts sticks from the associated set of receiving means simultaneously with the second set of inserting means positioning its portion of sticks in a row of mould cavities 50.

The individual parts of the apparatus are controlled by means of a central control unit including pneumatically operating means like the known apparatus.

The invention has been described with reference to a preferred embodiment. Many modifications may, however, be carried out without thereby deviating from the scope of the invention. Thus a set of inserting means corresponding to the ones shown in the above US-PS No. 4,105,384 may be used instead of the illustrated embodiment of the inserting means 16 and 17. The embodiment of the inserting means shown in said US specification requires, however, more distance between the two apparatus parts and consequently a larger displacement of the inserting means in horizontal direction.

I claim:

1. Apparatus for inserting sticks into ice cream bodies formed by portions of ice cream being filled into mould cavities open at the top and continuously or stepwise passing below the stick inserting apparatus, said apparatus comprising a stick feeding mechanism feeding sticks to a conveyor which reciprocates relative to said feeding mechanism and which advances the sticks to a set of receiving means gripping and removing said sticks from the conveyor, and where a set of inserting means are provided which remove the sticks from the receiving means so as to insert said sticks into the mould cavities, wherein two feeding mechanisms are provided for feeding their respective conveyor, said conveyors being associated with their respective set of receiving means and their respective set of inserting means, and wherein the sets of inserting means are disposed such that alternately they are moved into and insert the sticks in one and the same vertical inserting plane in the apparatus.

2. Apparatus as in claim 1, wherein the two sets of inserting means are disposed on a common frame, where the sets of inserting means are situated on their respective set of interconnected vertical guide bars and respectively, along which the sets of inserting means are alternately displaced downwards towards the mould cavities and upwards onto a level with the associated receiving means, and wherein the vertical guide bars are disposed on a plurality of horizontal guide bars in such a manner that the sets of inserting means present on said vertical guide bars reciprocate between the vertical inserting plane and the associated receiving means, the distance between said inserting plane and said associated receiving means being such that one set of inserting means is positioned so as to co-operate with the associated receiving means while the second set of inserting means is positioned in the inserting plane.

3. Apparatus as in claim 2, wherein the sets of interconnected vertical guide bars comprise bars respectively, situated at their respective end of the sets of inserting means when seen in the displacing direction of the conveyor, and wherein at each end of the sets of inserting means the vertical guide bars, respectively, are situated on their respective horizontal guide bar or on their respective set of horizontal guide bars permanently secured in the apparatus.

4. Apparatus as in claim 3, wherein the vertical guide bars are horizontally displaced by means of a first pneumatic cylinder actuating the vertical guide bars at one end of the sets of inserting means whereas the opposite end of said sets of inserting means is caused to enter a correctly locked position in outer displacement positions by means of a directly actuating second pneumatic cylinder.

* * * * *